(12) United States Patent
Batchelor (10) Patent No.: US 7,107,769 B2
(45) Date of Patent: Sep. 19, 2006

(54) MASTER CYLINDER

(75) Inventor: Mark Batchelor, Newport (GB)

(73) Assignee: Carlisle Brake Products (UK) Ltd., (GB)

( * ) Notice: Subject to any disclaimer, the term of this patent is extended or adjusted under 35 U.S.C. 154(b) by 0 days.

(21) Appl. No.: 10/936,784

(22) Filed: Sep. 8, 2004

(65) Prior Publication Data

US 2005/0057091 A1    Mar. 17, 2005

(30) Foreign Application Priority Data

Sep. 12, 2003   (GB) ................................ 0321389.9

(51) Int. Cl.
*B60T 13/00*   (2006.01)
(52) U.S. Cl. ................. 60/547.1; 60/593; 91/378; 29/401.1; 29/888.011
(58) Field of Classification Search ............. 60/547.1, 60/593; 91/376 R, 378; 29/401.1, 888.01, 29/888.011, 888.012
See application file for complete search history.

(56) References Cited

U.S. PATENT DOCUMENTS

| 3,054,387 | A | * | 9/1962 | Kellogg ................. 91/376 R |
| 3,543,508 | A | | 12/1970 | Schwab |
| 3,797,244 | A | | 3/1974 | Waters |
| 4,359,869 | A | * | 11/1982 | Ideta ........................ 60/547.3 |
| 5,778,672 | A | | 7/1998 | Durant et al. |
| 6,367,254 | B1 | | 4/2002 | Takasaki et al. |
| 6,609,370 | B1 | * | 8/2003 | Batchelor ................. 60/547.2 |
| 6,792,132 | B1 | * | 9/2004 | Hara et al. ................. 382/110 |
| 6,912,851 | B1 | * | 7/2005 | Batchelor et al. ............ 60/584 |

FOREIGN PATENT DOCUMENTS

| GB | 1 122 798 | 8/1968 |
| GB | 1 238 861 | 7/1971 |

OTHER PUBLICATIONS

MICO, Modulating hydraulic power brake valve, pp. 20-23.
United Kingdom Search Report dated Jan. 21, 2004.
European Search Report dated Jul. 5, 2005.

\* cited by examiner

*Primary Examiner*—Edward K. Look
*Assistant Examiner*—Michael Leslie
(74) *Attorney, Agent, or Firm*—Wood, Herron & Evans, L.L.P.

(57) ABSTRACT

A combined master cylinder and dump valve includes a piston slideable within a body bore that defines a master cylinder for pressurizing a brake port. The piston includes a piston seal for isolating a pressure port from a tank port, a piston bore, a first piston hole set for hydraulically connecting the pressure port to the piston bore and a second piston hole set for hydraulically connecting the piston bore to the tank port. A plunger slideably received in the piston bore has a plunger hole set for selectively connecting the first piston hole set with a plunger bore, and a plunger seal arrangement for selectively isolating the first piston hole set from the plunger bore. The plunger bore is hydraulically connected to the piston bore.

22 Claims, 5 Drawing Sheets

MASTER CYLINDER

REFERENCE TO RELATED APPLICATION

This application claims priority to Great Britain Patent Application GB 0321389.9 filed on Sep. 12, 2003.

TECHNICAL FIELD

The present invention relates generally to combined master cylinder and dump valves and also to a method of manufacturing such valves. The invention also relates to a method of manufacturing a combined master cylinder and booster.

BACKGROUND OF THE INVENTION

Certain vehicles, such as bulldozers, use a hydrostatic drive system. Typically, an engine-driven hydraulic pump provides a flow of pressurized hydraulic fluid to a hydraulic motor. The hydraulic motor is coupled to wheels (or tracks) of the vehicle. Thus, by driving the hydraulic motor, it is possible to maneuver the vehicle. The vehicle includes brakes, and to prevent overheating of the brakes, pressurized flow of the hydraulic fluid to the hydraulic motor should substantially cease prior to the brakes being applied.

It is known to provide a "dump valve" between the engine-driven hydraulic pump and the hydraulic motor. Opening of the dump valve causes the hydraulic pump and the hydraulic motor to vent to a tank, thereby ceasing driving input to the vehicle wheels. Once the dump valve is open, the brakes are then applied. In this way, the brakes are only required to slow the vehicle and do not act against any driving force of the hydraulic pump and the hydraulic motor.

Furthermore, certain other vehicles, such as agricultural tractors that do not typically use a hydrostatic drive system, are known to use a combined brake master cylinder and booster. Vehicles that use hydrostatic drive systems, such as the bulldozers discussed above, do not use a combined brake master cylinder and booster. Similarly, vehicles that use a combined brake master cylinder and booster do not have hydrostatic drive systems.

In combined brake master cylinder and boosters, brake pedal effort applied via a push rod is increased (or boosted), and a boosted force is applied to a master cylinder. Thus, such a device assists an operator of the vehicle when braking. Typically, the device is utilized with a mechanically driven vehicle. Thus, in order to apply the brake, the operator will typically have taken a foot off an accelerator pedal to apply it to a brake pedal, or alternatively will simultaneously depress a clutch pedal with one foot and the brake pedal with another foot. In either event, the driving input to the vehicle wheels ceases via a mechanism other than the combined brake master cylinder and booster. In other words, the combined brake master cylinder and booster plays no part in the ceasing of the driving input to the vehicle wheels.

SUMMARY OF THE INVENTION

The present invention provides a combined master cylinder and dump valve including a body having a body bore, a brake port, a tank port, and a pressure port. The brake port, the tank port, and the pressure port are each hydraulically connected with the body bore. A piston is slidable within the body bore.

The piston delimits a part of the body bore to define a master cylinder for pressurizing the brake port. The piston includes a piston seal for isolating the pressure port from the tank port. The piston also includes a piston bore, a first piston hole set for hydraulically connecting the pressure port to the piston bore, and a second piston hole set for hydraulically connecting the piston bore to the tank port. A plunger is slideably received in the piston bore. A plunger hole set selectively connects the first piston hole set with a plunger bore, and a plunger seal arrangement selectively isolates the first piston hole set from the plunger bore.

The plunger bore is hydraulically connected to the piston bore such that, in a rest condition, the master cylinder is unpressurized and the plunger seal arrangement isolates the first piston hole set from the plunger bore, thereby isolating the pressure port from the tank port. In an actuated condition, the plunger acts to slideably move the piston to pressurize the brake port, and the plunger hole set hydraulically connects the first piston hole set with the plunger bore, thereby hydraulically connecting the pressure port to the tank port.

The present invention also provides a method of manufacturing one of a combined master cylinder and dump valve and a combined master cylinder and booster. The method includes the steps of providing a body suitable for manufacturing either a combined master cylinder and dump valve or a combined master cylinder and booster, providing a first set of components for assembling with the body to provide a combined master cylinder and dump valve, providing a second set of components for assembling with the body to provide a combined master cylinder and booster. The method also includes the step of assembling one of the first set of components or the second set of components with the body to provide one of a combined master cylinder and dump valve or a combined master cylinder and booster.

The present invention also provides a method of manufacturing a combined master cylinder and dump valve and a combined master cylinder and booster including the steps of providing two identical bare body castings, machining a first bare body casting in a first manner to provide a combined master cylinder and dump valve body, and machining a second bare body casting in a second different manner to provide a combined master cylinder and booster body. The method also includes the steps of assembling a first set of components with the combined master cylinder and dump valve body to provide a combined master cylinder and dump valve and assembling a second set of components with the combined master cylinder and booster body to provide a combined master cylinder and booster.

A significant number of components of a known combined master cylinder and booster valves can be utilized to provide a combined master cylinder and dump valve. This potentially reduces both the cost of the known combined master cylinder and booster valves and the cost of a new combined master cylinder and dump valves.

These and other features of the present invention will be best understood from the following specification and drawings.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
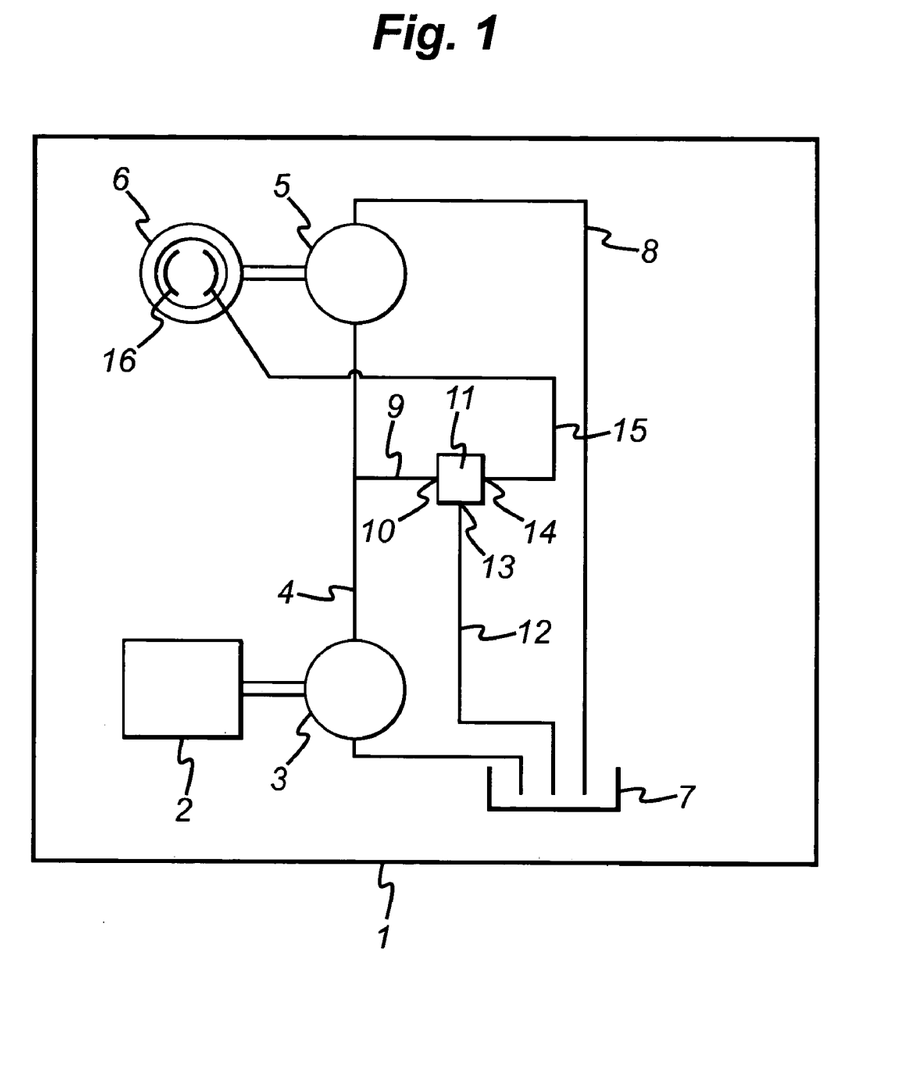
FIG. 1 is a schematic view of a hydraulic circuit incorporating a combined master cylinder and dump valve according to the present invention.
Figure 4:
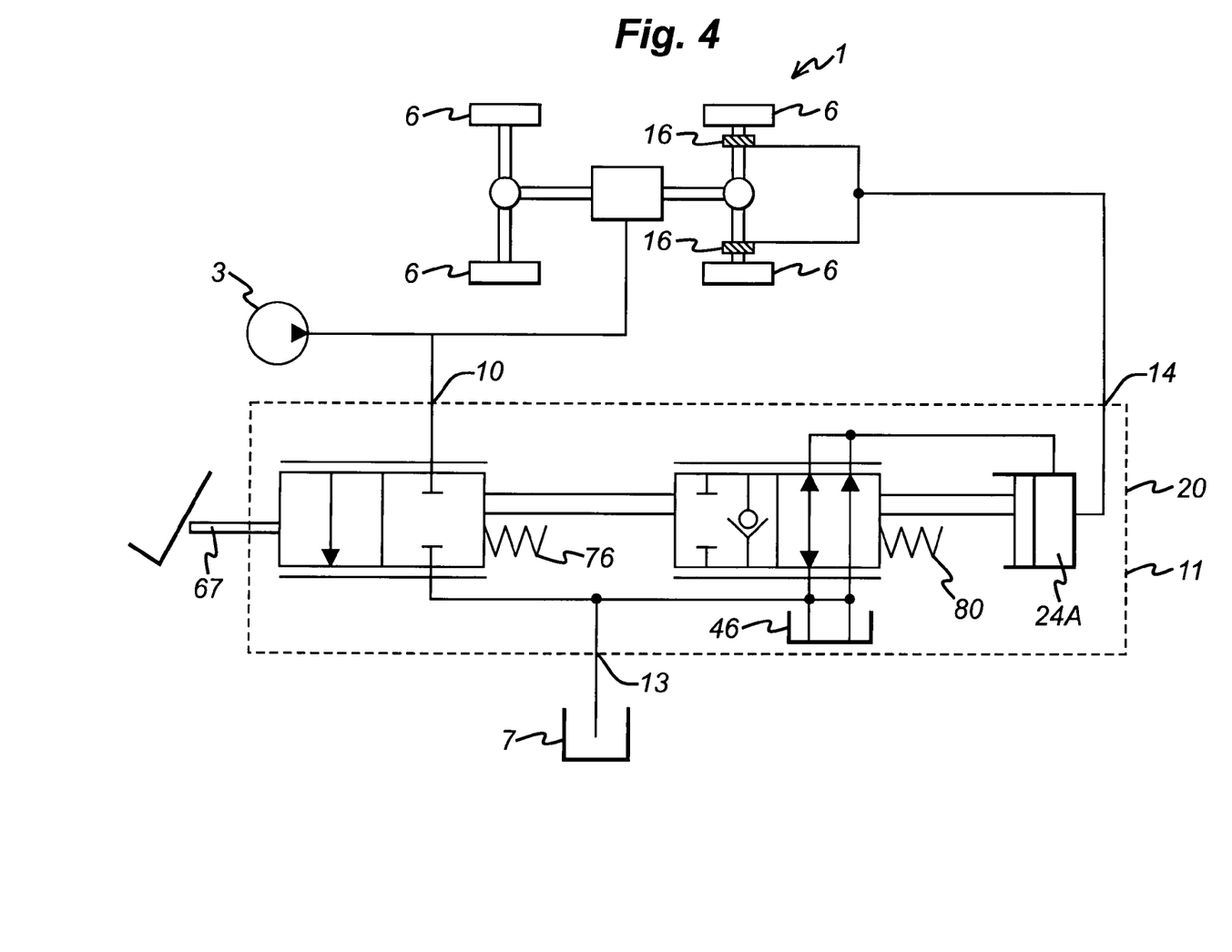
FIG. 4 is an alternative schematic view to FIG. 1 showing the internal operation of the combined master cylinder and dump valve in more detail.

FIGS. 1 and 4 show a vehicle 1 including an engine 2 drivingly coupled to a hydraulic pump 3. A hydraulic line 4 couples an output from the hydraulic pump 3 to an input of a hydraulic motor 5. The hydraulic motor 5 is drivingly coupled to wheels 6 of the vehicle 1. The output from the hydraulic motor 5 returns to a hydraulic tank 7 via a hydraulic line 8. Extending from the hydraulic line 4 is a hydraulic line 9, which is connected to a pressure port 10 of a combined master cylinder and dump valve 11 according to the present invention. A hydraulic line 12 connects a tank port 13 of the combined master cylinder and dump valve 11 to the hydraulic tank 7. A hydraulic line 15 connects a brake port 14 of the combined master cylinder and dump valve 11 to a brake 16. Operation of the vehicle is as follows.

To drive the vehicle, the engine 2 drives the hydraulic pump 3, which takes hydraulic fluid from the hydraulic tank 7 and pressurizes it. The pressurized fluid is then fed along the hydraulic line 4 to the hydraulic motor 5, which rotates and, in turn, rotates the wheel 6 and hence moves the vehicle 1. When a vehicle operator needs to brake the vehicle 1, the vehicle operator will apply a foot to the foot brake pedal, and dump valve components of the combined master cylinder and dump valve 11 will vent the hydraulic line 4 to the hydraulic tank 7 via the hydraulic line 9 and the hydraulic line 12. Master cylinder components of the combined master cylinder and dump valve 11 then hydraulically pressurize the hydraulic line 15, thereby applying the brakes 16.

Figure 2:
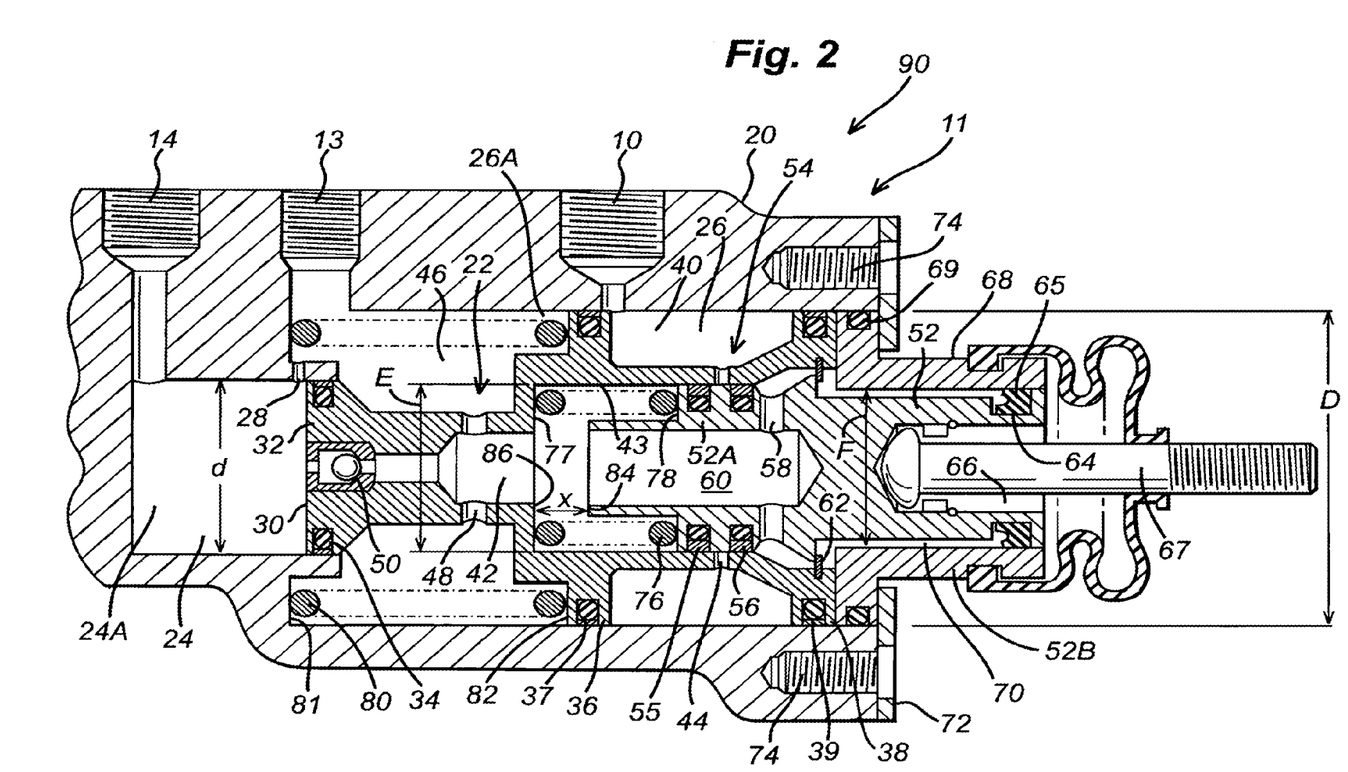
FIG. 2 is a schematic cross-section view of the combined master cylinder and dump valve according to the present invention in a rest position.
Figure 2A:
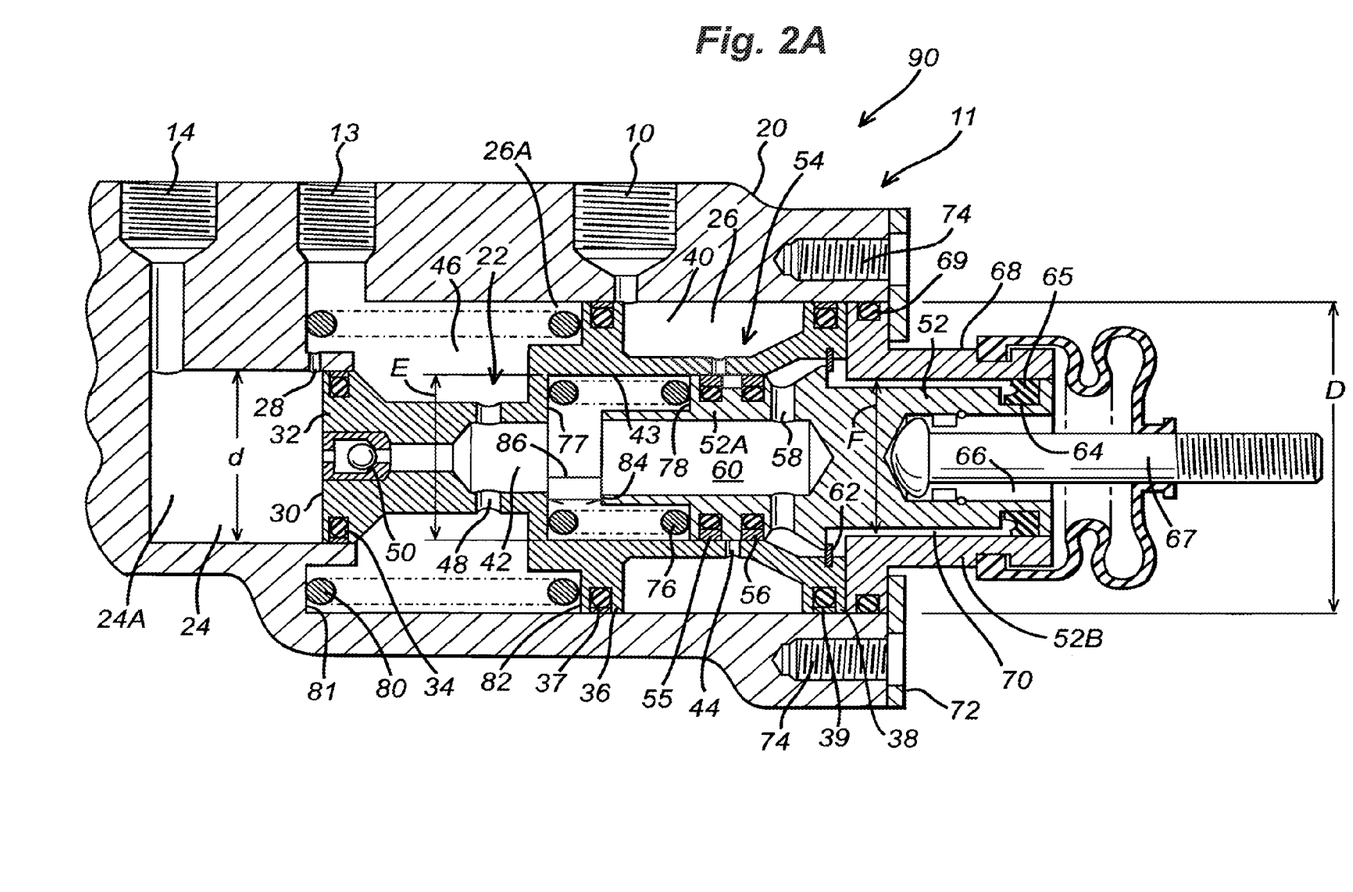
FIG. 2A is a schematic cross-section view of the combined master cylinder and dump valve according to another aspect of the present invention in a rest position.

The combined master cylinder and dump valve 11 can be seen in more detail in FIG. 2. The combined master cylinder and dump valve 11 includes a body 20, which is typically formed as a casting and then subsequently machined. The body 20 includes a central body bore 22 having a first cylindrical portion 24 of a diameter d and a second cylindrical portion 26 of diameter D. The pressure port 10 and the tank port 13 are both hydraulically connected to the second cylindrical portion 26, and the brake port 14 is hydraulically connected to the first cylindrical portion 24.

The first cylindrical portion 24 defines a master cylinder 24A, and the second cylindrical portion 26 defines a body main cylinder 26A. A master cylinder recuperation hole 28 is capable of selectively hydraulically connecting the master cylinder 24A with the body main cylinder 26A.

A piston 30 is slideably mounted within the body 20. A first end 32 of the piston 30 is received within the first cylindrical portion 24, and the remainder of the piston 30 is generally received within the second cylindrical portion 26. The first end 32 includes a master cylinder seal 34.

A first piston land 36 receives a first piston seal 37 for sealing the first piston land 36 to the second cylindrical portion 26. A second piston land 38 receives a second piston seal 39 for sealing the second piston land 38 to the second cylindrical portion 26. The first piston land 36 and the second piston land 38 are spaced apart axially and define an annular region 40 of the body main cylinder 26A. The piston 30 includes a piston bore 42 and a first piston hole set 44 which includes a series of circumferentially spaced radially orientated holes (only two of which are shown) that hydraulically connect the annular region 40 with the piston bore 42.

The piston 30, and in particular the first piston land 36, together with the body main cylinder 26A define an annular region 46 to the left of the first piston land 36 when viewing FIG. 2. A second piston hole set 48 includes a series of radially orientated holes (only two are shown) that hydraulically connect the piston bore 42 with the annular region 46. A check valve 50 is capable of selectively allowing the hydraulic fluid to flow from the piston bore 42 into the master cylinder 24A.

The piston bore 42 includes a cylindrical portion 43 having a diameter E. A first end 52A of a plunger 52 is slideably mounted within the cylindrical portion 43 (of diameter E). A plunger seal arrangement 54 including a first plunger seal 55 and a second plunger seal 56, both in sealing relationship with the walls of cylindrical portion 43, is mounted in the first end 52A. The first plunger seal 55 is axially spaced from the second plunger seal 56.

The first end 52A of the plunger 52 further includes a plunger hole set 58 which hydraulically connects a region of the piston bore 42 to the right (when viewing FIG. 2) of the second plunger seal 56 with a plunger bore 60 of the plunger 52.

A circlip 62 is mounted in a groove of the piston 30 and retains the plunger 52 generally within the piston bore 42. A second end 52B of the plunger 52 includes a groove 64 that receives a third plunger seal 65. The second end 52B further includes a recess 66 which receives a push rod 67.

A closing spigot 68 has a generally top hat cross section and includes a land having a spigot seal 69 to seal between the land and the second cylindrical portion 26. The closing spigot 68 includes a central bore 70 having a diameter F for slideably receiving the second end 52B of the plunger 52, and in particular for sealingly engaging the third plunger seal 65. In use, the closing spigot 68 does not move relative to the body 20. The spigot seal 69 prevents the leakage of hydraulic fluid outside of the combined master cylinder and dump valve 11. A closing plate 72 is secured to the body 20 via a bolt (not shown) or studs and nuts (not shown) which engage threaded holes 74.

A first resilient means in the form of a first spring 76 acts between a first spring abutment 77 of the piston 30 and a spring abutment 78 of the plunger 52 to bias the first spring abutment 77 and the spring abutment 78 apart. A second resilient means in the form of a second spring 80 acts between a spring abutment 81 of the body 20 and a second spring abutment 82 (in this case the first piston land 36) of the piston 30 to bias the spring abutment 81 and the second spring abutment 82 apart.

The plunger 52 includes a plunger abutment 84, and the piston 30 includes a corresponding piston abutment 86. In the rest condition as shown in FIG. 2, the plunger abutment 84 and the piston abutment 86 are spaced apart by a distance x. Operation of the combined master cylinder and dump valve 11 is as follows.

An operator pedal force is applied to the push rod 67 which initially moves the plunger 52 to the left relative to the piston 30, thereby progressively closing the distance x between the plunger abutment 84 and the piston abutment 86 and hydraulically connecting the pressure port 10 with the tank port 13, thereby operating as a dump valve. When the plunger abutment 84 contacts the piston abutment 86, the piston 30 moves to the left such that master cylinder seal 34 moves past the recuperation hole 28, thereby sealing the master cylinder 24A and allowing the brake port 14 to be pressurized to apply the brakes 16.

FIG. 4 shows a detailed schematic view of the combined master cylinder and dump valve 11 with the body 20 being represented by the chain dotted line. The three ports (the pressure port 10, the tank port 13 and the brake port 14) connect the associated external hydraulic lines with the body 20. It is important that no air enters the master cylinder 24A, and thus the check valve 50 and the master cylinder recuperation hole 28 must recuperate the master cylinder 24A from a region of the body 20 that is full of hydraulic fluid. In this case, the recuperation hole 28 and the check valve 50 both recuperate the master cylinder 24A from the annular region 46, which effectively acts as an internal tank. This internal "tank" is illustrated in FIG. 4.

The pressure port 10 is permanently hydraulically connected to the annular region 40 because the first piston seal 37 is always located to the left of the pressure port 10 when viewing FIG. 2, and the second piston seal 39 is always located to the right of the pressure port 10 even at the extreme of movement of the piston 30 towards the left when viewing FIG. 2. The annular region 40 is in permanent hydraulic connection with the first piston hole set 44. The tank port 13, the annular region 46, the second piston hole set 48, the piston bore 42, the plunger bore 60 and the plunger hole set 58 are all permanently hydraulically connected to each other. The hydraulic connection between the master cylinder 24A and the annular region 46 is selectively blocked as the master cylinder seal 34 passes to the left of the recuperation hole 28.

As shown in FIG. 2, the plunger seal arrangement 54 ensures that the first piston hole set 44 is hydraulically isolated from the plunger hole set 58 (and hence isolates the first piston hole set 44 from the second piston hole set 48). However, as the second plunger seal 56 moves to the left of the first piston hole set 44, the first piston hole set 44 becomes hydraulically connected with the plunger hole set 58 (and hence hydraulically connects the first piston hole set 44 with the plunger bore 60). The check valve 50 selectively allows for recuperation of the master cylinder 24A in a known manner.

FIG. 2 shows the combined master cylinder and dump valve 11 in a rest position with no force being applied to the push rod 67. The second spring 80 acts to bias the piston 30 into abutting engagement with the closing spigot 68, which acts as a stop. Similarly, the first spring 76 biases the plunger 52 to the right when viewing FIG. 2 and into abutting engagement with the circlip 62. In this position, the recuperating holes 28 are open, and the first piston hole set 44 has been closed by the plunger seal arrangement 54. The pressure port 10 cannot vent to the tank port 13, and hence the hydraulic line 9 is closed. Thus, the hydraulic pump 3 is capable of driving the hydraulic motor 5.

Preferably, the pressure port 10 is hydraulically connected to the tank port 13 (i.e., the dump valve is opened) before the master cylinder 24A pressurizes the brake port 14 (i.e., prior to the brakes being applied). To achieve this function, the first spring 76, the second spring 80 and the distance x between the plunger abutment 84 and the piston abutment 86 must be correctly designed. By way of example, one installation may have an installed pre-load on the second spring 80 of 200 Newtons. The first spring 76 may have an installed pre-load of 60 Newtons, and the distance x may be 7 mm. The spring rate of the first spring 76 would be 140 Newtons per 7 mm.

The installed pre-load of the first spring 76, when the combined master cylinder and dump valve 11 is in the rest position, is less than the installed pre-load of the second spring 80. Thus, when a force is applied to the push rod 67, the first spring 76 will compress before the second spring 80. As the push rod 67 moves to the left, the piston 30 initially remains stationary, and the plunger seal arrangement 54 moves to the left relative to the stationary first piston hole set 44. Further movement of the push rod 67 to the left causes the distance x between the plunger abutment 84 and the piston abutment 86 to further close. The second plunger seal 56 ultimately will move to the left of the first piston hole set 44, thereby hydraulically connecting the pressure port 10 to the tank port 13 and hence opening the dump valve.

As the plunger abutment 84 and the piston abutment 86 contact each other, the first spring 76 compresses by 7 mm and therefore exerts a load of 200 Newtons (i.e., an initial installed load of 60 Newtons plus 7 mm of compression at a rate of 140 Newtons per 7 mm compression). As the plunger abutment 84 and the piston abutment 86 contact each other, the spring load exerted by the first spring 76 is substantially equal to the spring load exherted by the second spring 80. Further movement of the push rod 67 to the left causes the plunger abutment 84 to press on the piston abutment 86, thereby moving the piston 30 to the left, closing the recuperation hole 28, and pressurizing the master cylinder and the brake port 14.

The release of the brake pedal causes the components to return the position shown in FIG. 2, thereby releasing the brake 16 and closing the dump valve and allowing the hydraulic pump 3 to drive the hydraulic motor 5 to move the vehicle.

As shown in FIG. 2, the first piston hole set 44 includes a plurality of holes spaced circumferentially around the piston 30. All the holes are formed at the same longitudinal position of the piston 30.

In a further preferred embodiment, the first piston hole set 44 can include a series (e.g., at least two or at least three) of spaced holes, preferably circumferentially spaced, with each hole being at a different longitudinal position of the piston 30. Clearly, if the plunger seal arrangement is in the form of a first plunger seal and a second plunger seal, then the first and second plunger seals must be spaced apart sufficiently to encompass all the holes of the first piston hole set 44 to ensure that the first piston hole set 44 is hydraulically isolated from the first plunger hole set 58 and a central region of the piston bore 42. In a preferred embodiment, the holes of the first piston hole set 44 are formed as part of a helix around the piston 30 circumference.

In one example, the first piston hole set 44 may include sixteen radially orientated holes each having a diameter of 1.5 mm. When formed as a helix, adjacent holes can be longitudinally offset by 0.2 mm. Thus, the actual distance between the first hole and the sixteenth hole would be 3 mm (i.e., 15 gaps×0.2 mm=3 mm). Furthermore, the total distance travelled by the plunger 52, relative to the piston 30, between when the first piston hole is starting to open and when the last piston hole is fully open is 4.5 mm (i.e., fifteen gaps×0.2 mm+1 hole diameter (1.5 mm)=4.5 mm). By arranging the holes in this manner, it is possible to provide a dump valve that progressively opens. This is particularly beneficial since it allows the operator to "inch forward" the vehicle 1 in a controlled manner, thereby allowing for good control of the vehicle 1 at very slow speeds. The term "hole set" covers a set having any number of holes, including just a single hole.

As mentioned above, the holes are preferably provided on a helix, though it is not necessary to provide the holes in this form in order to provide a first piston hole set 44 wherein different holes are positioned at different longitudinal positions on the piston 30.

Typically, the sixteen hole arrangements mentioned above might be used in conjunction with a distance x between the plunger abutment 84 and the piston abutment 86 of 7 mm. This allows for manufacturing tolerance errors and an initial movement of the plunger 52 (for example 2 mm) between the rest position and a position where the first of the sixteen holes starts to open.

The spring force of the first spring 76, when compressed by the distance x (200 Newtons), is substantially equal to the spring force of the second spring 80 when in a rest condition (also 200 Newtons). This provides for a good pedal feel and a substantially seamless transition from the dump valve being fully open to the start of the brakes being applied.

Certain components of the combined master cylinder and dump valve 11 act as a master cylinder, and certain other components of the combined master cylinder and dump valve 11 act as a dump valve (shown generally by the arrow 90). The dump valve 90 and the master cylinder act sequentially, i.e. the dump valve 90 opens, and then the master cylinder applies the brakes.

FIG. 2 shows various elastomeric seals. Under certain circumstances, where a limited amount of seal leakage can be tolerated, certain seals can be defined by a simple piston land or a plunger land in the absence of any elastomeric or other separate "sealing" component.

Figure 3:
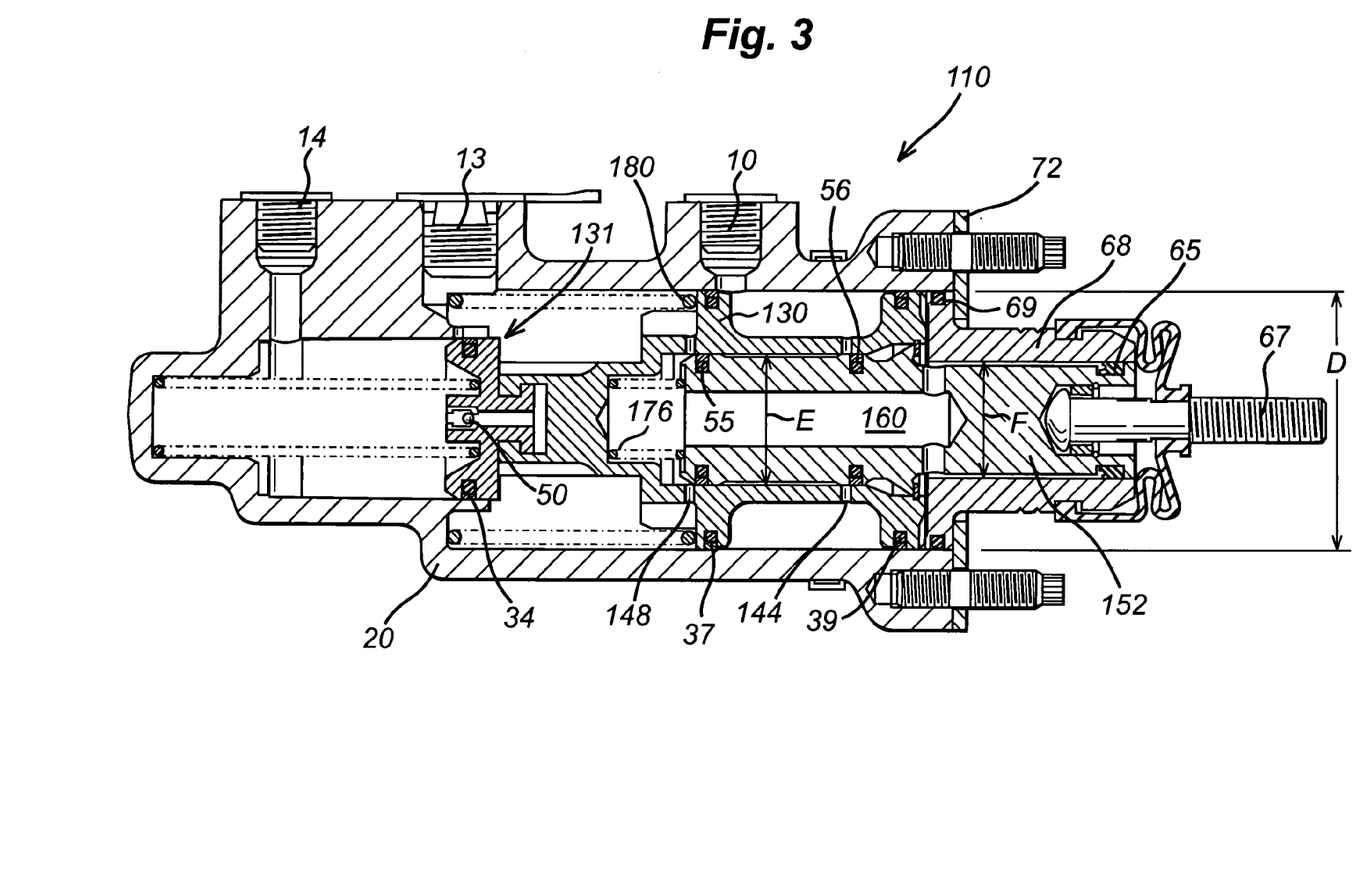
FIG. 3 is a manufacturing cross-section drawing of a known combined master cylinder and booster in a rest position.

The present invention adapts a known combined master cylinder and booster to provide a combined master cylinder and dump valve 11. FIG. 3 shows a known combined master cylinder and booster 110. Certain components of the combined master cylinder and booster 110 are identical to the components of the combined master cylinder and dump valve 11. In particular, the body 20, the master cylinder seal 34, the check valve 50, the first piston seal 37, the second piston seal 39, the third plunger seal 65, the first plunger seal 55, the second plunger seal 56, the closing plate 72, the closing spigot 68, the closing spigot seal 69, and the push rod 67 are identical.

These components may look different simply because FIG. 3 is an engineering manufacturing drawing, and FIG. 2 is a schematic drawing. By way of explanation, FIG. 3 includes protective caps over the ports which are removed prior to fitting the valve.

When a combined master cylinder and dump valve 11 according to the present invention is manufactured by adapting a known combined master cylinder and booster 110, the combined master cylinder and dump valve 11 may have a body bore which includes a body main cylinder engaged by a piston seal. The body main cylinder has a diameter (D). A plunger 152 includes a seal in slideable engagement with a spigot wall, and the spigot wall is fixed relative to the body main cylinder and has a spigot wall diameter (F). The body main cylinder (D) is at least 1.412 times larger than the spigot wall diameter (F), alternatively at least 1.732 times larger, alternatively at least 2.000 times larger, or alternatively at least 2.236 times larger.

Operation of combined master cylinder and booster 110 is known, but will now be briefly described. A first piston hole set 144 of a piston 130 includes a series of circumferentially spaced, radially orientated holes. However, all the holes are located at the same axial position on the piston. A second piston hole set 148 also includes a series of circumferentially spaced radially orientated holes that are all located at the same longitudinal position on the piston 130. The first piston hole set 144 is positioned just to the left of the second plunger seal 56, and the second piston hole set 148 is positioned just to the left of the first plunger seal 55.

As the push rod 67 moves to the left by operating a foot brake, the plunger 52 initially moves to the left such that the first plunger seal 55 and the second plunger seal 56 initially close all of the holes of their corresponding piston hole sets 148 and 144. Continued movement of the push rod 67 to the left causes the first plunger seal 55 and the second plunger seal 56 to partially open all of the holes of their corresponding hole set 148 and 144. This allows pressurized fluid from the pressure port 10 to enter the plunger bore 160, causing the piston 130 to move to the left and resulting in the first plunger seal 55 and the second plunger seal 56 closing all of their corresponding holes. This pressurized fluid then becomes trapped in the plunger bore 160 and acts on the plunger 152 (the effective working diameter of the plunger 152 is equivalent to the diameter F of the spigot wall) to force the plunger 152 to the right when viewing FIG. 3 and acts on the diameter D of the piston 130 to force the piston 130 to the left when viewing FIG. 3. Since the diameter D is larger than the diameter F, the force applied to the push rod 67 is "boosted" by the ratio of (D×D/F×F), and hence the force applied to a master cylinder piston portion 131 of the piston 130 is greater than the force applied to the push rod 67.

To provide a boost ratio of 2-1, the diameter D of the piston 130 needs to be 1.412 times larger than the diameter F of the plunger 52. Boost ratios of 3-1, 4-1 and 5-1 can be provided by ensuring that the diameter D is 1.732, 2.000, 2.236 times larger than the diameter F, respectively.

Both a first spring 176 and a second spring 180 are partially compressed when the booster is operating to boost a push road load. This can be contrasted with a combined master cylinder and dump valve 11 according to the present invention, wherein during progressive opening of the dump valve, the first spring 76 is compressed and the second spring 80 remains in the initially installed condition.

A comparison of the piston 30 and the piston 130 shows relatively few differences. The main difference is the position of the second piston hole sets 48 and 148. In particular, the master cylinder piston portion 131 can be identical to the corresponding portion of the piston 30.

Furthermore, a comparison of the plunger 52 and the plunger 152 again shows relatively few differences. The main difference is in the alternative positioning of the first plunger seal 55. In particular, the second plunger seal 56 is located at the same position, and the part of the plunger 152 to the left of the second plunger seal 56 is identical to the corresponding part of the plunger 52.

The present invention adapts a device (the combined master cylinder and booster 110) having one type of valve (a booster valve) to a completely different device (combined master cylinder and dump valve 11) having a completely different sort of valve (a dump valve) for use in a completely different application. This adaptation has been carried out using a considerable number of common components, potentially providing both a cheaper combined master cylinder and dump valve 11 and a combined master cylinder and booster 110.

There is no "boosting" aspect to the combined master cylinder and dump valve 11. The boost ratio of the combined master cylinder and booster 110 is dependent upon the relative diameters F and D. It is possible to retain the same diameters D and F of a combined master cylinder and booster 110 and apply them to a combined master cylinder and dump valve 11, even though the relative diameters play no part in the operation of the combined master cylinder and dump valve 11.

Typically, the body 20 will be made from a casting. Where there are minor differences between the finally machined body of a combined master cylinder and dump valve 11 and the finally machined body of a combined master cylinder and booster 110 (e.g., a different thread size on one or more of the ports), it is possible to use a common bare body casting and machine it in a slightly different manner to provide for the slightly differing combined master cylinder and dump valve 11 and combined master cylinder and booster 110 finally machined bodies. However, under other circumstances, it is possible to use the same bare casting and machine it in an identical manner (for example, the body 20) to provide a body for both a combined master cylinder and dump valve 11 and a combined master cylinder and booster 110.

Similarly, it is possible to provide a common bare piston casting which is machined in a slightly different manner to provide a combined master cylinder and dump valve piston or a combined master cylinder and booster piston. Similarly, the plunger may be provided as a common bare casting and machined slightly differently to provide a combined master cylinder and dump valve plunger or a combined master cylinder and booster plunger.

It is possible to produce identical bare castings and under certain circumstances, machine the bare castings in an identical manner to provide for devices (a combined master cylinder and dump valve 11 or a combined master cylinder and booster 110) that have significantly different applications.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A combined master cylinder and dump valve comprising:
   a body including a body bore, a brake port, a tank port, and a pressure port, wherein each of the brake port, the tank port, and the pressure port are hydraulically connected with the body bore;
   a piston slideable within the body bore, the piston including a master cylinder seal for delimiting a part of the body bore to define a master cylinder for pressurizing the brake port, the piston further including a piston seal for isolating the pressure port from the tank port, a piston bore, a first piston hole set for hydraulically connecting the pressure port to the piston bore and a second piston hole set for hydraulically connecting the piston bore to the tank port;
   a plunger slideably received in the piston bore and including a plunger bore, a plunger hole set for selectively connecting the first piston hole set with the plunger bore, and a plunger seal arrangement for selectively isolating the first piston hole set from the plunger bore, and the plunger bore is hydraulically connected to the piston bore; and
   a recuperation hole in the body bore for selectively hydraulically connecting the master cylinder and the tank port,
   wherein the piston and plunger are selectively positionable between a rest position in which the plunger seal arrangement isolates the first piston hole set from the plunger hole set to isolate the pressure port from the tank port and the recuperation hole connects the master cylinder and tank port, a dump position in which the first piston hole set is in communication with the plunger hole set to hydraulically connect the pressure port and tank port and the recuperation hole connects the master cylinder and tank port, and brake position in which first piston hole set is in communication with the plunger hole set to hydraulically connect the pressure port and tank port and the master cylinder seal isolates the master cylinder from the recuperation hole and tank port to enable the master cylinder and brake port to be pressurized.

2. The combined master cylinder and dump valve as defined in claim 1 further including a spigot wall fixed relative to the body, the spigot wall having a spigot wall diameter, the body bore including a body main cylinder engaged by the piston seal, the body main cylinder having a body main cylinder diameter, wherein the plunger includes a plunger seal in slideable engagement with the spigot wall and wherein the body main cylinder diameter is larger than the spigot wall diameter.

3. The combined master cylinder and dump valve as defined in claim 1 wherein the body bore includes a first cylindrical portion having a first diameter defining the master cylinder and a second cylindrical portion having a second diameter defining a body main cylinder, wherein the second diameter is larger than the first diameter.

4. The combined master cylinder and dump valve as defined in claim 1 wherein the piston seal has a pressure port side and a tank port side, and the first piston hole set is located on the pressure port side of the piston seal and the second piston hole set is located on the tank port side of the piston seal.

5. The combined master cylinder and dump valve as defined in claim 1 wherein at least one hole of the first piston hole set, the second piston hole set, and the plunger hole set is radially orientated.

6. The combined master cylinder and dump valve as defined in claim 1 wherein the first piston hole set includes two holes, each of the two holes being located at a different axial position such that movement of the plunger relative to the piston progressively hydraulically connects each of the two holes of the first piston hole set with the plunger bore.

7. The combined master cylinder and dump valve as defined in claim 1 wherein the plunger seal arrangement includes a first plunger seal and a second plunger seal in an axially spaced apart relationship.

8. The combined master cylinder and dump valve as defined in claim 1 further including a first resilient member wherein the first resilient member operably acts between the piston and the plunger to bias the plunger to a plunger rest condition.

9. The combined master cylinder and dump valve as defined in claim 1 further including a retaining member wherein the plunger is retained in the piston bore by the retaining member.

10. The combined master cylinder and dump valve as defined in claim 1 wherein the plunger includes a plunger abutment and the piston includes a piston abutment wherein in the rest condition, the plunger abutment is spaced from the piston abutment, and in the actuated condition, the plunger abutment abuts the piston abutment to move the piston to pressurize the brake port.

11. The combined master cylinder and dump valve as defined in claim 10 further including a second resilient member, wherein the second resilient member operably acts between the piston and the body to bias the piston to a piston rest condition.

12. The combined master cylinder and dump valve as defined in claim 11 further including a first resilient member, wherein the first resilient member provides a first bias force when the plunger abutment contacts the piston abutment and the second resilient member provides a second bias force when the piston is in the piston rest condition, and the first bias force is at least substantially equal to the second bias force, and substantially all holes of the first piston hole set are hydraulically connected to the plunger bore before the brake port is pressurized by the master cylinder.

13. The combined master cylinder and dump valve as defined in claim 12 wherein a first installed load of the first resilient member is less than a second installed load of the second resilient member when the combined master cylinder and dump valve is in the rest position.

14. The combined master cylinder and dump valve as defined in claim 1 further including an internal tank of the body wherein the recuperation hole is in communication with the tank port via the internal tank of the body.

15. A method of manufacturing one of a combined master cylinder and dump valve and a combined master cylinder and booster comprising the steps of: providing a body for manufacturing one of a combined master cylinder and dump valve and a combined master cylinder and booster; providing a first set of components for assembling with the body to provide the combined master cylinder and dump valve; providing a second set of components for assembling with the body to provide the combined master cylinder and booster; and assembling one of the first set of components and the second set of components with the body to provide the one of the combined master cylinder and dump valve and the combined master cylinder and booster.

16. The method of manufacturing as defined in claim 15 including the step of providing at least one of a piston seal, a check valve, a closing spigot, and a plunger push rod that are common to the first set of components and the second set of components.

17. The method of manufacturing as defined in claim 15 including the steps of providing two identical bare castings for a piston, machining a first bare casting in a first manner to provide a first piston for the first set of components, and machining a second bare casting in a second manner different from the first manner to provide a second piston for the second set of components.

18. The method of manufacturing as defined in claim 17 wherein the first piston includes a first set of piston seal retainers and the second piston includes a second set of piston seal retainers which are identical to the first set of piston seal retainers.

19. A method of manufacturing a combined master cylinder and dump valve and a combined master cylinder and booster comprising the steps of: providing two identical bare body castings; machining a first bare body casting in a first manner to provide a combined master cylinder and dump valve body; machining a second bare body casting in a second manner different from the first manner to provide a combined master cylinder and booster body; assembling a first set of components with the combined master cylinder and dump valve body to provide a combined master cylinder and dump valve; and assembling a second set of components with the combined master cylinder and booster body to provide a combined master cylinder and booster.

20. A method of operating a combined master cylinder and dump valve comprising:

providing a combined master cylinder and dump valve including a body bore having a brake port, a tank port, and a pressure port in hydraulic communication therewith, a piston that is slideably positioned within the body bore and including a master cylinder seal to define a master cylinder for pressuring the brake port, the body bore including a recuperation hole for selectively hydraulically connecting the master cylinder and tank port, piston bore, a first piston hole set for hydraulically connecting the pressure port to the piston bore and a second piston hole set for hydraulically connecting the piston bore to the tank port, and a plunger slideably positioned in the piston bore, the plunger including a plunger bore in hydraulic communication with the piston bore, a plunger hole set for selectively hydraulically connecting the first piston hole set with the plunger bore, and a plunger seal arrangement for selectively isolating the first piston hole set from the plunger hole set;

selectively placing the piston and plunger in a rest position wherein the plunger hole set and the plunger seal arrangement are positioned to hydraulically isolate the pressure port from the tank port and the recuperation hole hydraulically connects the master cylinder and tank port such that the master cylinder and brake port are unpressurized;

selectively placing the piston and plunger in a dump position by slideably moving the plunger relative to the piston wherein the plunger hole set and the plunger seal arrangement are positioned to place the plunger hole set in communication with the first piston hole set to hydraulically connect the pressure port and tank port and the recuperation hole hydraulically connects the master cylinder and tank port such that the master cylinder and brake port are unpressurized; and selectively placing the piston and plunger in a brake position wherein the plunger hole set and the plunger seal arrangement are positioned to place the plunger hole set in communication with the first piston hole set to hydraulically connect the pressure port and tank port and wherein the plunger acts to slideably move the piston and master cylinder seal to a position that isolates the master cylinder from the recuperation hole and the tank port such that the master cylinder and brake port are pressurized.

21. The method of operating a combined master cylinder and dump valve of claim 20 further including the step of biasing the piston and plunger to the rest position.

22. The method of operating a combined master cylinder and dump valve of claim 20 wherein the steps of selectively placing the piston and plunger in one of a rest position, a dump position and a brake position includes slideably moving the plunger with a push rod.

* * * * *